(12) United States Patent
Kamini et al.

(10) Patent No.: US 10,755,567 B2
(45) Date of Patent: Aug. 25, 2020

(54) DETERMINING VEHICLE PARKED LOCATION

(71) Applicant: GM GLOBAL TECHNOLOGY OPERATIONS LLC, Detroit, MI (US)

(72) Inventors: Aditya S. Kamini, Bloomfield Hills, MI (US); Hassan A. Elnajjar, Dearborn, MI (US); Richard Elswick, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 234 days.

(21) Appl. No.: 15/913,472

(22) Filed: Mar. 6, 2018

(65) Prior Publication Data

US 2019/0279509 A1  Sep. 12, 2019

(51) Int. Cl.
*G08G 1/123* (2006.01)
*H04W 4/029* (2018.01)
*H04W 4/44* (2018.01)
*H04W 4/80* (2018.01)

(52) U.S. Cl.
CPC ............ *G08G 1/123* (2013.01); *H04W 4/029* (2018.02); *H04W 4/44* (2018.02); *H04W 4/80* (2018.02)

(58) Field of Classification Search
CPC .......... H04W 4/44; H04W 4/80; H04W 4/29; H04W 4/48; G08G 1/205; G08G 1/123; G08G 1/005
See application file for complete search history.

(56) References Cited

U.S. PATENT DOCUMENTS

| 10,354,531 | B1 * | 7/2019 | Bronder | G06F 16/29 |
|---|---|---|---|---|
| 2010/0063670 | A1 * | 3/2010 | Brzezinski | H04L 67/1095 |
| | | | | 701/31.4 |
| 2012/0130777 | A1 * | 5/2012 | Kaufman | G07B 15/02 |
| | | | | 705/13 |
| 2014/0256258 | A1 * | 9/2014 | DeLuca | H04W 4/80 |
| | | | | 455/41.2 |
| 2014/0379442 | A1 * | 12/2014 | Dutta | G07F 17/246 |
| | | | | 705/13 |
| 2015/0039224 | A1 * | 2/2015 | Tuukkanen | H04W 4/38 |
| | | | | 701/500 |
| 2015/0161834 | A1 * | 6/2015 | Spahl | G07C 9/00111 |
| | | | | 340/5.61 |

* cited by examiner

*Primary Examiner* — Mussa A Shaawat
(74) *Attorney, Agent, or Firm* — Reising Ethington P.C.; David Willoughby

(57) ABSTRACT

A method and system of determining a parked location of a vehicle, the method including: establishing a short-range wireless communication (SRWC) connection with the vehicle using a personal SRWC device, wherein the SRWC connection operates according to a first protocol; carrying out a SRWC service that is associated with the SRWC; detecting termination of the SRWC service independently of a termination of the SRWC connection; in response to the detection of the termination of the SRWC service, obtaining a location of the personal SRWC device; and storing the location of the personal SRWC device as a parked location of the vehicle.

17 Claims, 2 Drawing Sheets

DETERMINING VEHICLE PARKED LOCATION

INTRODUCTION

The disclosure relates to determining or estimating a location of a vehicle based on a short-range wireless communication (SRWC) connection with a personal SRWC device.

Vehicles now include many vehicle system modules (VSMs) that are able to perform various electronic processing. For example, some vehicles include a global navigation satellite system (GNSS) that can be used to obtain the location of the vehicle. However, some countries prohibit or restrict use of such devices. Additionally, other devices, such as personal short-range wireless communications (SRWC) devices may be present at a vehicle and in the possession of one or more passengers or operators of the vehicle. These personal SRWC devices also include various processing capabilities and, in some instances, can include the ability to determine the location of the device. Also, these personal SRWC devices may be able to carry out SRWC with the vehicle. For example, many electronic devices can transmit voice and data communications over both a short-range wireless network, such as Bluetooth™ and/or a cellular network. However, in some scenarios, an operating system (OS) of the personal SRWC device may not allow certain applications to gain access to certain device properties, including SRWC connection information.

SUMMARY

According to one aspect of the invention, there is provided a method of determining a parked location of a vehicle, the method including: establishing a short-range wireless communication (SRWC) connection with the vehicle using a personal SRWC device, wherein the SRWC connection operates according to a first protocol; carrying out a SRWC service that is associated with the SRWC; detecting termination of the SRWC service independently of a termination of the SRWC connection; in response to the detection of the termination of the SRWC service, obtaining a location of the personal SRWC device; and storing the location of the personal SRWC device as a parked location of the vehicle.

According to various embodiments, this method may further include any one of the following features or any technically-feasible combination of some or all of these features:

- the steps of: receiving vehicle state information concerning the vehicle; determining whether the vehicle is in a parked state based on the received vehicle state information; and carrying out the obtaining step in response to both the detection of the termination of the audio streaming channel and to the determination that the vehicle is in a parked state;
- the vehicle state information is received via a connection to a remote server facility;
- the obtaining step is carried out in response to receive an indication from the vehicle via the established SRWC connection that the vehicle is in a parked state;
- the established SRWC connection is carried out according to a first SRWC protocol, wherein the SRWC service is carried out according to a second protocol, and wherein the SRWC service further includes using the first protocol to carry out communications in addition to the second protocol;
- the SRWC connection is a Bluetooth™ connection, wherein the first protocol is a Bluetooth™ protocol, and wherein the SRWC service is carried out according to a Bluetooth™ profile;
- the Bluetooth™ profile is an advanced audio distribution profile (A2DP), an audio/video remote control profile (AVRCP), a hands-free profile (HFP), a health device profile (HDP), a human interface device profile (HID), a headset profile (HSP), a serial port profile (SPP), a SIM access profile (SAP), or a video distribution profile (VDP);
- the SRWC service is carried out according to a profile of the SRWC or according to a sub-protocol of the SRWC;
- the location of the personal SRWC device is a coordinate location of the personal SRWC device as determined by a GNSS receiver of the personal SRWC device, wherein the determination of the coordinate location includes receiving a plurality of global navigation satellite (GNSS) signals from a plurality of GNSS satellites and determining a coordinate location of the personal SRWC device through processing the plurality of GNSS signals;
- determining whether to use location information of the personal SRWC device as the parked location of the vehicle and, when it is determined to use location information of the personal SRWC device as the parked location of the vehicle, then carrying out the obtaining step; and/or
- the termination of the SRWC service is detected by determining that the SRWC service is no longer being used or has become disconnected.

According to another aspect of the invention, there is provided a method of determining a parked location of a vehicle, the method including: establishing a short-range wireless communication (SRWC) connection with the vehicle using a personal SRWC device, wherein the SRWC connection operates according to a first protocol; establishing a SRWC service channel using the established SRWC connection, wherein the dedicated SRWC service channel is established according to a SRWC profile; detecting termination of the SRWC service channel independently of a termination of the SRWC connection; determining that the vehicle is in a parked state; in response to the detection of the termination of the SRWC service channel, obtaining a coordinate location of the personal SRWC device by: receiving a plurality of global navigation satellite system (GNSS) signals from a plurality of GNSS satellites at a GNSS receiver included on the personal SRWC device; processing the plurality of GNSS signals using the GNSS receiver to obtain the coordinate location of the personal SRWC device; and storing the coordinate location of the personal SRWC device as a parked location of the vehicle.

According to various embodiments, this method may further include any one of the following features or any technically-feasible combination of some or all of these features:

- determining whether the vehicle is in a parked state comprises receiving an indication from the vehicle that the vehicle is in the parked state, wherein the indication is based on analysis of vehicle state information of the vehicle;
- the SRWC service channel is established according to a SRWC profile, wherein the established SRWC connection includes carrying out a SRWC core protocol and wherein the SRWC profile includes a supplementary protocol that is carried out in conjunction or based on the SRWC core protocol; and/or the SRWC service channel is an audio and/or video streaming channel that is used to stream audio and/or video from the personal SRWC device to the vehicle.

According to yet another aspect of the invention, there is provided a personal short-range wireless communication (SRWC) device, including: a short-range wireless communication (SRWC) circuit that enables SRWC between the personal SRWC device and another SRWC device; a global navigation satellite system (GNSS) receiver that is configured to receive a plurality of GNSS signals from a constellation of GNSS satellites; a memory including a vehicle parked location application; and a processor for carrying out the vehicle parked location application; wherein the vehicle parked location application includes computer instructions that, when executed by the processor, causes the personal SRWC device to: establish a short-range wireless communication (SRWC) connection with a vehicle using a personal SRWC device, wherein the SRWC connection operates according to a first protocol; carry out a SRWC service that is associated with the SRWC; detect termination of the SRWC service independently of a termination of the SRWC connection; in response to the detection of the termination of the SRWC service, obtain a location of the personal SRWC device based on the plurality of GNSS signals; and store the location of the personal SRWC device as a parked location of the vehicle.

According to various embodiments, this system may further include any one of the following features or any technically-feasible combination of some or all of these features:
- a vehicle-device application stored in the memory, and wherein the vehicle-device application, when executed by the processor, uses the SRWC service;
- the vehicle parked location application, when executed by the processor, further causes the personal SRWC device to: receive an indication from the vehicle via the established SRWC connection that the vehicle is in a parked state;
- an operating system (OS) of the personal SRWC device disallows SRWC core connection information to be monitored or known by certain third-party applications; and/or
- the established SRWC connection is carried out according to a first SRWC protocol, wherein the SRWC service is carried out according to a second protocol, and wherein the SRWC service further includes using the first protocol to carry out communications in addition to the second protocol.

BRIEF DESCRIPTION OF THE DRAWINGS

Exemplary embodiments will hereinafter be described in conjunction with the appended drawings, wherein like designations denote like elements, and wherein.

DETAILED DESCRIPTION

Figure 1:
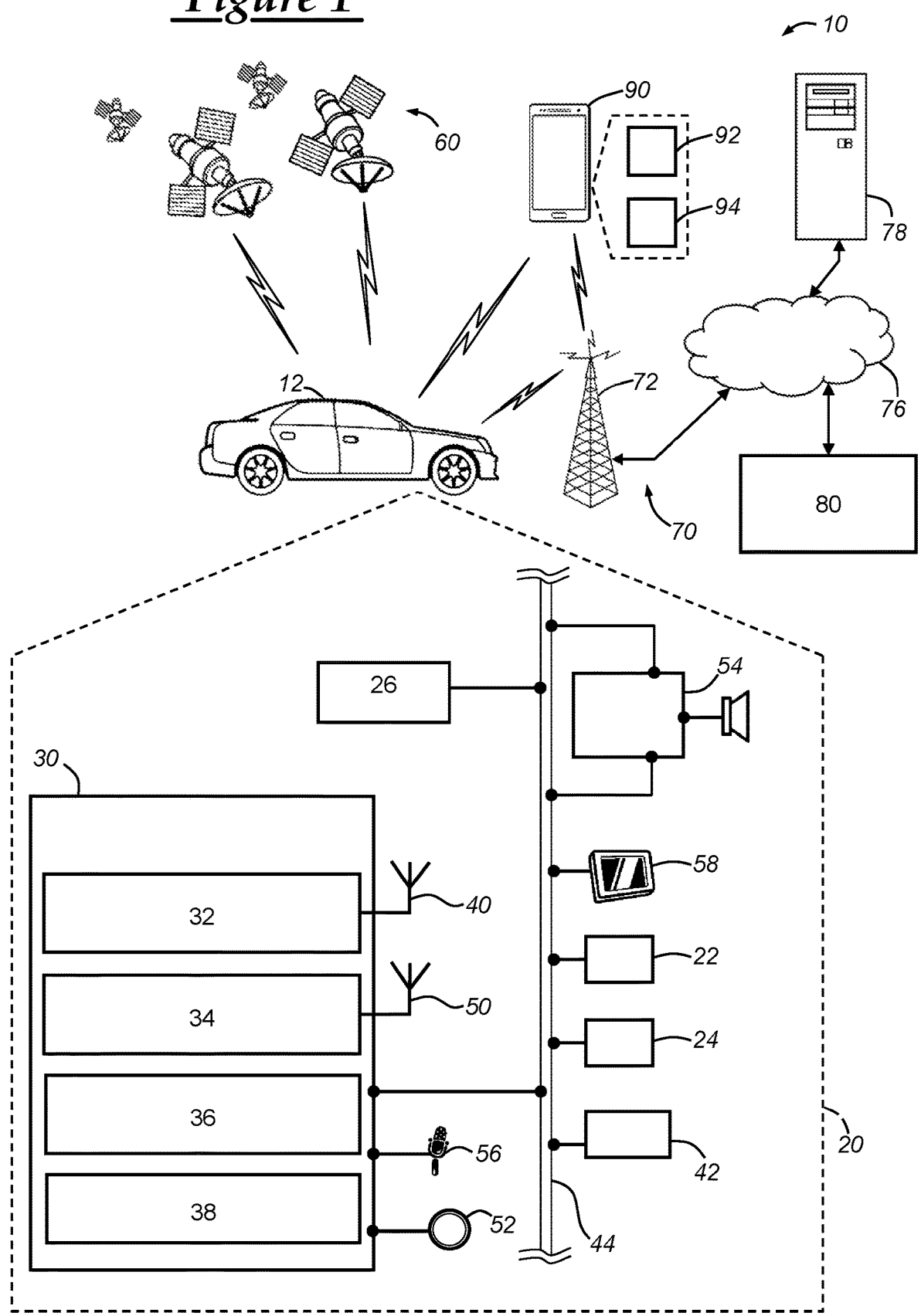
FIG. 1 is a block diagram depicting an embodiment of a communications system that is capable of utilizing the method disclosed herein.

The system and methods below enable a personal short-range wireless communications (SRWC) device to determine or estimate a parking location of a vehicle based on the termination of a SRWC connection with the vehicle. Vehicles typically include means to determine their location, such as through use of a global navigation satellite system (GNSS). However, certain countries, states, or territories (or geopolitical regions) may impose certain requirements on GNSS receivers and/or other location services such that the vehicle may not be able to determine its location through conventional means. And, in some embodiments, GNSS reception may be poor thereby causing inaccurate geographical locations to be calculated. Thus, at least according to one embodiment, the system and/or methods discussed herein can be used to determine or at least estimate a vehicle location based on a location of a personal SRWC device, such as a smartphone or tablet. The location of the personal SRWC can be obtained or determined when a SRWC connection is terminated. Further, this determination can include receiving information regarding the state of the vehicle (e.g., from the vehicle via the SRWC connection or from a remote server facility) and, then, using this information to determine whether the vehicle is in a parked state (or is likely in a parked state). If so, the personal SRWC device can then use its location as the vehicle's parked location upon termination of the SRWC connection.

In some scenarios, the method can be implemented on an application (or computer program) (referred to as a vehicle parked location application) that is stored on and executable by the personal SRWC device. According to some embodiments, the operating system (OS) of the personal SRWC device may not permit SRWC connection information regarding a parent SRWC connection (e.g., SRWC core connection information) to be monitored or known by certain third-party applications (i.e., applications not written or released by the device or OS manufacturer). However, these third-party applications may be entitled to monitor audio streaming connections, such as those which are formed using (or that follow a protocol of) a parent SRWC protocol or scheme. For example, a Bluetooth™ connection may be established between the personal SRWC device and the vehicle, as well as a child protocol (or Bluetooth™ profile) that more particularly defines the type of connection or the type of information being or to be communicated using the SRWC (e.g., Bluetooth™) connection. Thus, at least according to one embodiment, the method and system discussed herein enable monitoring an instance of an SRWC service or profile (e.g., audio streaming connection) and, when it is determined that the instance of the SRWC service or profile is terminated, then determining a location of the personal SRWC device and storing the determined location as the vehicle's parked location, or at least as the estimated parked location of the vehicle.

This approach provides an improvement in mobile device functionality since it enables an application on the mobile device to perform SRWC-based location determination at the conclusion of a vehicle trip in instances where device-to-vehicle SRWC connection information is not available to that application. This and other advantages are described below in connection with the illustrated embodiment.

Referring now to FIG. 1, there is shown an operating environment that comprises a communications system 10 and that can be used to implement the method disclosed herein. Communications system 10 generally includes a vehicle 12 with a wireless communications device 30 and a body control module (BCM) 26, a constellation of global navigation satellite system (GNSS) satellites 60, one or more wireless carrier systems 70, a land communications network 76, a computer 78, a remote facility 80, and a personal short-range wireless communication (SRWC) device 90. It should be understood that the disclosed method can be used with any number of different systems and is not specifically limited to the operating environment shown here. Also, the architecture, construction, setup, and general operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be used for one or more purposes, such as a remote server accessible by vehicle 12. In one embodiment, the computers 78 can act as a vehicle backend services server that can monitor states of a plurality of vehicles, as well as send such information to other devices, such as a personal SRWC device. This vehicle state information can then be used by these other devices through execution of a vehicle control/information application. Other such accessible computers 78 can be, for example: a public key infrastructure (PKI) server used to generate security entitlements; a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to the vehicle 12.

Remote facility 80 may be designed to provide the vehicle electronics 20 and mobile device 90 with a number of different system back-end functions through use of one or more electronic servers. For example, remote facility 80 can act as a vehicle backend services server that can monitor states of a plurality of vehicles, as well as send such information to other devices, such as a personal SRWC device. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. A database at the remote facility can store account information such as subscriber authentication information, vehicle identifiers, vehicle state information, profile records, behavioral patterns, and other pertinent subscriber information. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

The personal short-range wireless communication (SRWC) device 90 is a mobile device and may include: hardware, software, and/or firmware enabling SRWC as well as other personal (or mobile) device applications. In one embodiment, the personal SRWC device 90 can include a vehicle-device application 92 and a global navigation satellite system (GNSS) receiver. According to various embodiments, the personal SRWC device can include Android™, iOS™, Windows™ Phone, Windows™ Mobile, BlackBerry™ Tizen™, and/or other various operating systems. In one particular embodiment, the personal SRWC device can be a personal cellular SRWC device that includes cellular connectivity capabilities, as well as SRWC capabilities. Using a cellular chipset, for example, the personal SRWC device can connect with various remote devices, including computers 78 and remote server facility 80. As used herein, a personal SRWC device is a mobile device that is capable of SRWC, that is portable by a user, and where the portability of the device is at least partly dependent on the user, such as a wearable device (e.g., a smartwatch), an implantable device, or a handheld device (e.g., a smartphone, a tablet, a laptop). As used herein, a short-range wireless communications (SRWC) device is a device capable of SRWC. The hardware of SRWC mobile device 90 may comprise: a processor and memory (e.g., non-transitory computer readable medium configured to operate with the processor) for storing the software, firmware, etc. The personal SRWC device's processor and memory may enable various software applications 92, which may be preinstalled or installed by the user (or manufacturer) (e.g., having a software application or graphical user interface (GUI)).

The personal SRWC device 90 can include an electronic processor and memory. The processor (or processing device) can be any type of device capable of processing electronic instructions including microprocessors, microcontrollers, host processors, controllers, vehicle communication processors, and application specific integrated circuits (ASICs). The processor of the personal SRWC device 90 executes various types of digitally-stored instructions, such as software or firmware programs stored in memory of the personal SRWC device, which enable the device 90 to provide a wide variety of services. The memory of the personal SRWC device may be volatile (e.g., powered memory) and/or non-volatile memory in the form of non-transitory computer readable medium. The non-transitory computer readable medium may be any of a number of different forms of RAM or ROM, such as flash memory or other solid state memory that stores some or all of the software needed to carry out the various external device functions discussed herein.

Figure 2:
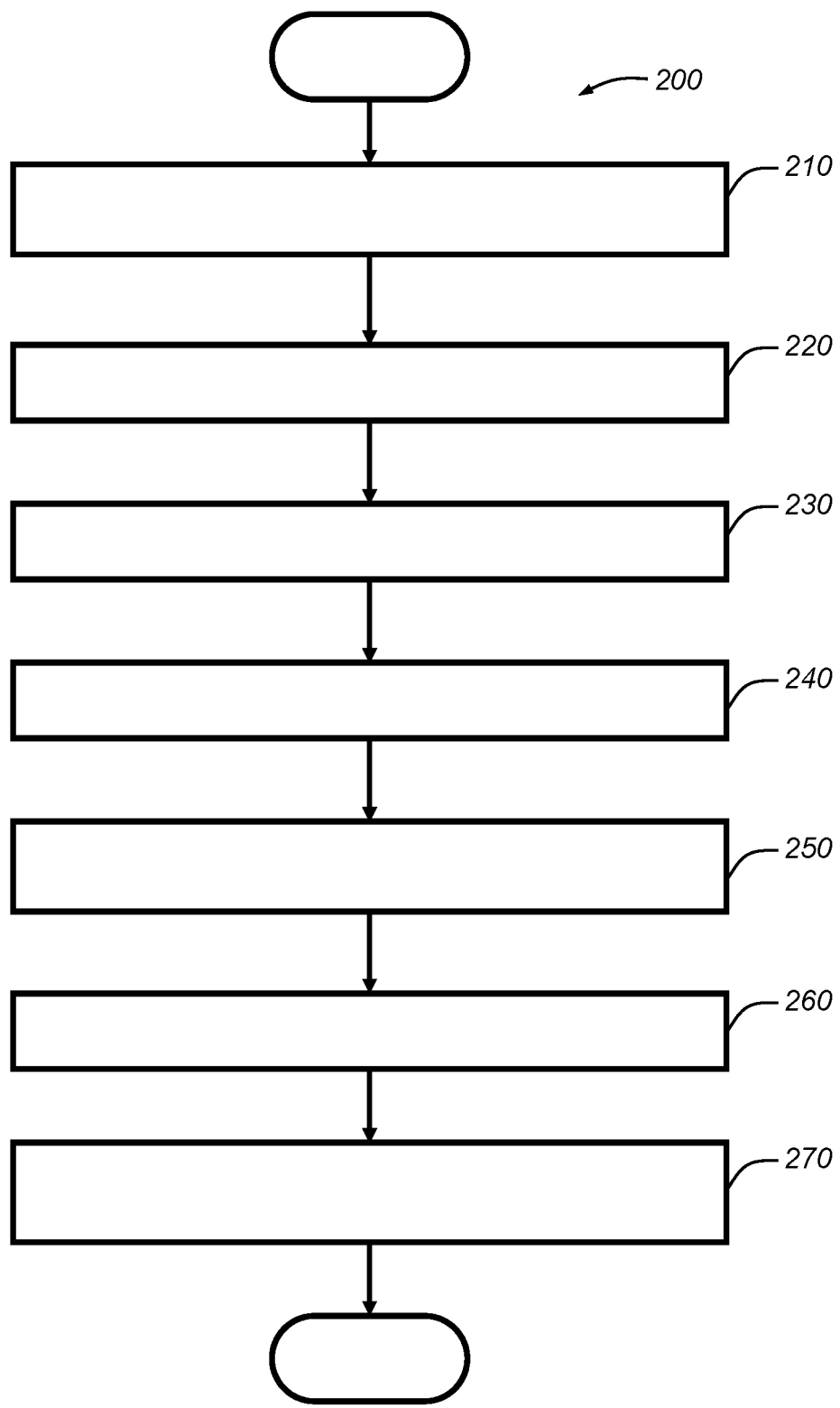
FIG. 2 is a flowchart illustrating a method of determining a parked location of a vehicle.

One implementation of a vehicle-device application 92 may enable the personal SRWC device to carry out the method discussed herein, such as method 200 discussed below (FIG. 2). In such a case, the vehicle-device application 92 can be referred to as a vehicle parked location application. Alternatively or additionally, the vehicle-device application 92 (or another vehicle-device application) can enable a vehicle user to communicate with the vehicle 12 and/or control various aspects or functions of the vehicle, some of which are listed below. In some embodiments, the application 92 may also allow the user to connect with the remote facility 80 or call center advisors at any time and may permit receiving vehicle state information from such remote facility. In other embodiments, there may be a plurality of personal SRWC devices 90. Such devices may communicate with wireless communications device 30 or with each other according to one or more SRWC technologies or wired connections, such as a connection using a Universal Serial Bus (USB) cable.

In another embodiment, the vehicle-device application 92, which may be a third-party application or a vehicle parked location application, may enable audio or video to be streamed to the vehicle and, in some cases, may include establishing and/or carrying out a SRWC service according to a profile of the SRWC or according to a sub-protocol associated with the SRWC. The SRWC service can be hands-free service (e.g., a hands-free audio or telecommunications service), an audio and/or video streaming or buffering service, and/or various other services. In one particular embodiment, a Bluetooth™ connection is established between the personal SRWC device and the vehicle (e.g., using wireless communications device 30) and the SRWC service is carried out according to a Bluetooth™ profile and using the Bluetooth™ connection.

In some embodiments, the personal SRWC device can include an operating system (OS) that does not permit a third-party application (such as the vehicle-device application 92) to obtain certain information regarding SRWC connections (e.g., connection status information), but may permit a device to determine service or profile information regarding certain SRWC services or profiles that are carried out over the SRWC connection. In one embodiment, SRWC service connection information can be obtained that includes a connection status or indicator of the SRWC service. For example, the personal SRWC device may not be able to determine Bluetooth™ connectivity status, but may be able to determine whether a particular Bluetooth™ profile is being used or is established, such as whether an audio streaming service or profile is being used or established.

The personal SRWC device 90 can be used to determine a location of the personal SRWC device. In one embodiment, the personal SRWC device can include a GNSS receiver 94 that can be used to receive a plurality of GNSS signals from a plurality (or constellation) of GNSS satellites 60. The GNSS receiver can then use certain techniques to obtain a coordinate location of the personal SRWC device, which can include a latitudinal coordinate, a longitudinal coordinate, and/or an elevation coordinate or height.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a GNSS receiver 22, engine control unit (ECU) 24, a body control module (BCM) 26, a wireless communications device 30, other vehicle system modules (VSMs) 42, and numerous other components and devices. Some or all of the different vehicle electronics may be connected for communication with each other via one or more communication busses, such as bus 44. Communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, such as the GNSS receiver 22, ECU 24, BCM 26, wireless communications device 30, and vehicle-user interfaces 52-58, as will be described in detail below. The vehicle 12 can also include other VSMs 42 in the form of electronic hardware components that are located throughout the vehicle and, which may receive input from one or more sensors and use the sensed input to perform diagnostic, monitoring, control, reporting, and/or other functions. Each of the VSMs include an electronic processor (such as processor 36 of wireless communication device 30) along with memory (such as memory 38 of wireless communication device 30) which may be a volatile memory and/or non-transitory computer readable memory as discussed above in connection with SRWC device 90. At least some of the VSM 42 are preferably connected by communications bus 44 to the other VSMs, as well as to the wireless communications device 30, and can be programmed to run vehicle system and subsystem diagnostic tests. One or more VSMs 42 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Body control module (BCM) 26 is shown in the exemplary embodiment of FIG. 1 as being electrically coupled to communication bus 44. In some embodiments, the BCM 26 may be integrated with or part of a center stack module (CSM) and/or integrated with wireless communications device 30. Or, the BCM and CSM may be separate devices that are connected to one another via bus 44. In one particular embodiment, BCM 26 may be isolated and connected to the wireless communications device 30 and select VSMs on an isolated portion of the bus 44, or connected to the wireless communications device 30 and select VSMs via a separate communications bus. BCM 26 can include a processor and/or memory, which can be similar to processor 36 and memory 38 of wireless communications device 30, as discussed below. BCM 26 may communicate with wireless communications device 30 and/or one or more vehicle system modules, such as GPS 22, audio system 54, or other VSMs 42. BCM may include a processor and memory such that the BCM may direct one or more vehicle operations including, for example, controlling central locking, air conditioning, power mirrors, controlling the vehicle primary mover (e.g., engine, primary propulsion system), and/or controlling various other vehicle modules. BCM 26 may receive data from wireless communications device 30 and, subsequently, send the data to one or more vehicle modules.

Additionally, BCM 26 may provide vehicle state information, which is information corresponding to the vehicle state or of certain vehicle components or systems. For example, the BCM may provide the wireless communications device 30 with information indicating whether the vehicle's ignition is turned on, the gear the vehicle is presently in (i.e. gear state), and/or other information regarding the vehicle. This information can be communicated to a vehicle backend services facility 80 or to a personal SRWC device via a SRWC connection and then used to determine whether the vehicle is in a parked state (e.g., in a neutral gear, parking brake engaged).

Wireless communications device 30 is capable of communicating data via short-range wireless communications (SRWC) and, in some embodiments, may be capable of communicating data via cellular network communications. As shown in the exemplary embodiment of FIG. 1, wireless communications device 30 includes an SRWC circuit 32, a cellular chipset 34, an electronic processor 36, memory 38, and antennas 40 and 50. In many embodiments, the wireless communications device 30 may be specifically configured to carry out the method disclosed herein. In one embodiment, wireless communications device 30 may be a standalone module or, in other embodiments, device 30 may be incorporated or included as a part of one or more other vehicle system modules, such as a center stack module (CSM), BCM 26, an infotainment module, a telematics unit, a head unit, and/or a gateway module. In some embodiments, the device 30 can be implemented as an OEM-installed (embedded) or aftermarket device that is installed in the vehicle.

Wireless communications device 30 can be configured to communicate wirelessly according to one or more wireless protocols, including short-range wireless communications (SRWC) such as any of the IEEE 802.11 protocols, Wi-Fi™, WiMAX™, ZigBee™, Wi-Fi Direct™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication circuit 32 enables the wireless communications device 30 to transmit and receive SRWC signals, such as BLE signals. The SRWC circuit may allow the device 30 to connect to another SRWC device. Additionally, in some embodiments, the wireless communications device may contain a cellular chipset 34 thereby allowing the device to communicate via one or more cellular protocols, such as those used by cellular carrier system 70.

Wireless communications device 30 may enable vehicle 12 to be in communication with one or more remote networks via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. Memory 38 may be volatile (e.g., powered memory) and/or non-volatile memory in the form of non-transitory computer readable medium. The non-transitory computer readable medium may be any of a number of different forms of RAM or ROM, such as flash memory or other solid state memory that stores some or all of the software needed to carry out the various external device functions discussed herein.

In one embodiment, the wireless communications device 30 may operate both when the vehicle is in a powered on state and when the vehicle is in a powered off state. As used herein, a "powered on state" is a state of the vehicle in which the ignition or primary propulsion system of the vehicle is powered on and, as used herein, a "powered off state" is a state of the vehicle in which the ignition or primary propulsion system of the vehicle is not powered on. The operation or state of the wireless communications device 30 may be controlled by another vehicle system module, such as by BCM 26 or by an infotainment module. In the powered on state, the wireless communications device 30 may always be kept "on" or supplied with power from a vehicle battery or other power source. In the powered off state, the wireless communications device 30 may be kept in a low-power mode or may be supplied power periodically so that device 30 may wake up and perform operations. In one embodiment, a state change from a powered on state to a powered off state can be detected and used in determining whether the vehicle is in a parked state.

The vehicle may use the wireless communications device 30 to detect the presence of other SRWC devices, such as personal SRWC devices 90. A connection between the wireless communications device 30 and one or more devices 90 may allow for the operation of various vehicle-device functionality. Vehicle-device functionality (or function) refers to any function of the vehicle that involves direct or indirect communication with a mobile device; this may include: any function that may be initiated, implemented, or otherwise carried out through a mobile device; any function of the mobile device that may be initiated, implemented, or otherwise carried out through the vehicle; or any other function that may be carried out using both the vehicle and one or more mobile devices. For example, vehicle-device functionality can include using the SRWC device 90 to provide the vehicle with a contact list that may be displayed on visual display 58, audio/visual media content to be played via speakers 54 or display 58, navigational information (e.g., start and/or end locations), and/or vehicle commands or instructions that direct the vehicle to perform some operation. Other examples of vehicle-device functionality include using the vehicle electronics to provide the personal mobile device with hands-free calling, such as through use of vehicle-user interfaces to place, receive, and carry out voice calls; sending information to the personal mobile device, such as geographical information to the mobile device 90 (such as information obtained from the GNSS receiver 22) or vehicle diagnostic information or codes; and carrying out commands (e.g., commands to perform certain vehicle functions) received at the vehicle from the personal mobile device.

A vehicle function is any function or operation that may be performed by the vehicle, including initiating or booting a telematics unit, a GNSS receiver, an infotainment unit, a center stack module (CSM), or other VSM. Additionally, a vehicle function may be unlocking or locking the vehicle doors via the BCM, starting the ignition or primary propulsion system of the vehicle, disabling/enabling the vehicle ignition or primary propulsion system, heating or cooling passenger seats included in the vehicle, performing air conditioning or heating of the vehicle cabin, turning off/on or flashing headlights or other lights included in the vehicle, emitting an audible sound using a vehicle horn or speakers (such as those included in audio system 54), downloading information (e.g., information pertaining to a car sharing service reservation) or content data (e.g., audio/video playlists or files) from a remote facility 80 or computer 78 (including information that may be particular to the user of the SRWC device and/or associated with the SRWC device), downloading or uploading information and/or content data from or to the SRWC device, and/or performing various other operations or functions of the vehicle, many of which are described herein.

Wireless communications device 30 may be set to a discovery mode when the vehicle desires to connect to a SRWC device, such as personal mobile device 90. As used herein, a discovery mode is an operating mode for a SRWC device in which the SRWC device attempts to discover or detect other SRWC devices using a SRWC protocol or technology. The discovery mode may include periodically or intermittently sending out messages or advertisements in an attempt to elicit a response from other SRWC devices in range. In one embodiment, the wireless communications device 30 may transmit a Bluetooth™ Low Energy advertising package (e.g., an advertisement), such as an ADV_IND (an undirected advertisement) message, an ADV_DIRECT_IND (a directed advertisement) message, or an ADV_SCAN_IND (scan-able undirected advertisement). For example, the wireless communications device 30 may transmit an ADV_IND message according to a predefined or predetermined time interval (e.g., 30 milliseconds (ms)). Or, the device 30 may vary the time interval by randomizing the interval (e.g., randomly or pseudo-randomly selecting a time between 10 ms and 40 ms for each advertisement).

Upon detection of a SRWC device (e.g., a personal mobile device) or receipt of a wireless advertisement or other message from a SRWC device, the wireless communications device 30 may communicate with the client device (e.g., personal SRWC device 90) to establish a secured connection by transmitting and receiving one or more wireless messages. In one embodiment, the personal SRWC device 90 (e.g., the client device) may receive the advertisement and then send a connection request in response thereto. The wireless communications device 30 can then detect the personal SRWC device 90 through receiving the connection request message from device 90. The connection request message from device 90 indicates that the device 90 desires to establish a SRWC connection with the vehicle 12. Subsequent communications between the vehicle and the mobile device may be carried out to establish the SRWC connection. For example, vehicle 12 and personal SRWC device 90 may carry out a pairing process to establish a Bluetooth™ Low Energy connection, which may involve user verification (e.g., verification of a pin or alphanumeric string).

In one embodiment, a SRWC connection may be established according to a BLE protocol and, subsequently, a SRWC service channel (such as a streaming audio or video channel) may be established using the established SRWC connection. The SRWC channel can be a particular implementation of the underlying SRWC connection and may be established using a particular streaming channel protocol, but that uses the underlying SRWC connection to facilitate the transmission and reception of data. The protocol for establishing and/or carrying out the streaming channel can be carried out on top of the wireless transmission protocol that functions to facilitate wireless communications between the personal SRWC device and the vehicle. For example, the established SRWC connection can include carrying out a SRWC core protocol, such as a Bluetooth™ core protocol. And, where the SRWC service channel is established according to a SRWC profile, the SRWC profile can include a supplementary protocol that is carried out in conjunction or based on the SRWC core protocol. The supplementary protocol can be unique to the SRWC profile and can use certain functionality that is specified in the SRWC core protocol and that is used in communicating data via the established SRWC connection. As mentioned above, certain operating systems (OS) used for personal SRWC devices may disallow SRWC core connection information (such as Bluetooth™ core connection information) to be shared with certain applications, such as all third-party applications and/or applications that are not specifically granted access by a maker or manufacturer of the OS or personal SRWC device.

The establishment of the SRWC connection may include generating and/or sharing a secret between the vehicle and the personal SRWC device (the "shared secret"). In one embodiment, the wireless communications device 30 and the personal SRWC device 90 can share or each receive the same or corresponding information and, in response thereto, a shared secret (e.g., a symmetric encryption key) can be generated and/or obtained at each device. Once the personal SRWC device 90 and the vehicle 12 obtain the shared secret, the mobile device 90 and vehicle 12 can store the shared secret. The storing of the shared secret at each respective device results in the devices being "bonded" to one another such that establishment of future SRWC connections between personal SRWC device 90 and vehicle 12 may be expedited by accessing the stored shared secret instead of having to generate a new shared secret.

In some cases, the personal SRWC device 90 and the wireless communication device 30 may already have been "bonded" to one another. As used herein, "bonded" means that two devices (e.g., the wireless communications device 30 and personal SRWC device 90) have previously obtained a shared secret and each has stored the shared secret, which may be an identifier, and/or other information that allows the devices to subsequently establish a new connection without having to carry out the pairing process (i.e., exchanging security codes or keys). "Bluetooth™ bonded" refers to devices that are bonded using Bluetooth™ as the SRWC. Upon detection of a SRWC device, the wireless communications device 30 may determine whether the wireless communications device 30 is bonded to the personal SRWC device.

Once a connection is established between the wireless communications device 30 and the personal SRWC device 90, wireless messages may be sent between the vehicle and the personal SRWC device. These wireless messages and/or the SRWC that sent these wireless messages may be authenticated and/or authorized by the vehicle. The authorization and/or authentication of the personal SRWC device (or other SRWC device) may include verifying the identity of the personal SRWC device and/or the user of the personal SRWC device, as well as checking for authorization of the personal SRWC device and/or the user of the personal SRWC device.

The communications between the vehicle and the personal SRWC device may allow for functionality of the smartphone to be used by the vehicle electronics, or vice versa. For example, in the case where the personal SRWC device is a cellular-enabled smartphone, received calls at the smartphone may be carried out through the audio system 54 and/or through use of microphone 56 of the vehicle electronics 20. This may be done so through the phone sending all received audio data or signals to the wireless communications device 30, which then may use bus 44 to send the audio signals to audio system 54. Likewise, video received at the smartphone 90 may be sent to the visual display 58 via the wireless communications device 30. Also, audio received at microphone 56 in the vehicle electronics may be sent to the smartphone 90 via wireless communications device 30. These communications can be carried out according to a SRWC service or a SRWC profile associated with the established and/or underlying SRWC connection between the personal SRWC device and the wireless communications device 30.

Global navigation satellite system (GNSS) receiver 22 receives radio signals from a constellation of GNSS satellites. In one embodiment, the GNSS receiver 22 may be a global positioning system (GPS) receiver, which may receive GPS signals from a constellation of GPS satellites 60. From these signals, the receiver 22 can determine vehicle position which may enable the vehicle to determine whether it is at a known location, such as home or workplace. Moreover, GNSS receiver 22 can provide this location data to wireless communications device 30, which can then use this data to identify known locations, such as a vehicle operator's home or workplace. Additionally, GNSS receiver 22 may be used to provide navigation and other position-related services to the vehicle operator. Navigation information can be presented on the display 58 (or other display within the vehicle) or can be presented verbally such as is done when supplying turn-by-turn navigation. The navigation services can be provided using a dedicated in-vehicle navigation module (which can be part of GNSS receiver 22), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 78, for other purposes, such as fleet management and/or for use in a car sharing service. Also, new or updated map data can be downloaded to the GNSS receiver 22 from the remote facility 80 via a vehicle telematics unit. The above discussed characteristics of GNSS receiver 22 can also be attributed to GNSS receiver 94 of the personal SRWC device 90 to the extent such characteristics are not inconsistent with those expressly discussed characteristics of the GNSS receiver 94.

Although vehicle 12 is shown as including GNSS receiver 22, in other embodiments, the vehicle may not include a GNSS receiver or may not be configured to utilize the GNSS receiver. For example, the vehicle 12 may be manufactured according to global parameters and, thus, a GNSS receiver may be included even though such a module may not be usable by certain applications of the vehicle or the personal SRWC device. In some countries and/or other geopolitical regions, the government disallows use of certain location determining devices and, thus, GNSS receivers 22 may not be included in vehicle 12 or may be disabled (at least for purposes of determining a parked vehicle location).

Vehicle electronics 20 also includes a number of vehicle-user interfaces that provide vehicle occupants with a means of providing and/or receiving information, including pushbutton(s) 52, audio system 54, microphone 56, and visual display 58. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 44 and an entertainment bus (not shown) and can provide AM, FM and satellite radio, CD, DVD and other multimedia functionality. This functionality can be provided in conjunction with or independent of an infotainment module. Microphone 56 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 58 is preferably a graphics display, such as a touch screen on the instrument panel or a heads-up display reflected off of the windshield, and can be used to provide a multitude of input and output functions.

Various other vehicle-user interfaces can also be utilized, as the interfaces of FIG. 1 are only an example of one particular implementation.

With reference to FIG. 2, there is shown an embodiment of a method 200 of determining a parked location of a vehicle. The method 200 can be carried out by various devices that can establish a SRWC connection with the vehicle, such as personal SRWC device 90. Specifically, method 200 can be implemented using one or more computer programs that are stored on a non-transitory, computer-readable medium of the personal SRWC device, and that can be carried out by a processor (or processing device) that is included in the personal SRWC device. Generally, the method 200 can include the steps of establishing a SRWC connection, establishing a SRWC service that is carried out over the established SRWC connection, detecting termination of the SRWC service independently of a termination of the SRWC connection, obtaining the location of the personal SRWC device, and storing the location of the personal SRWC device as the parked location of the vehicle (or the parked vehicle location). However, various other embodiments exist, as will be apparent from the discussion below in light of the discussion of system 10 provided above.

Method 200 begins with step 210, wherein a short-range wireless communication (SRWC) connection is established with a vehicle. The SRWC connection can be carried out according to any of the SRWC protocols discussed above, including various Wi-Fi or Bluetooth™ protocols. In one embodiment, a Bluetooth™ Low Energy (BLE) connection is established. The establishment step can include performing a four-way handshake to obtain or generate a shared secret for use in encrypting communications that will be communicated over the connection. In other embodiments, the personal SRWC device and the vehicle (or wireless communications device 30) can be bonded such that both devices have stored shared secret(s) that can be used in securing SRWC communications between the two devices. Once a SRWC connection is established, the method 200 continues to step 220.

In step 220, a SRWC service associated with the SRWC used in the SRWC connection is carried out. In at least one embodiment, the SRWC service is carried out and/or established according to a profile of the SRWC or to a sub-protocol (or supplementary protocol) of the SRWC. In a particular embodiment, an audio and/or video streaming channel is established using the established SRWC connection and according to a profile of the SRWC. For example, a Bluetooth™ connection may be established (step 210) and, thereafter, an audio streaming profile (e.g., advanced audio distribution profile (A2DP)) may be established between the two devices, which can include carrying out a sub-protocol or additional protocol on top or in addition to the SRWC protocol used to establish and/or carry out communications over the SRWC connection. Operation of the personal SRWC device and the wireless communications device 30 of the vehicle according to a SRWC profile may include establishing a channel that is to be used or reserved for the particular SRWC service.

In one embodiment, carrying out a SRWC service may include establishing a SRWC service channel that is used for carrying out particular data as a part of the SRWC service. For example, an audio and/or video streaming channel can be established through defining a profile or type of connection during or after establishing the SRWC connection (step 210). And, in some embodiments, the SRWC profile can define a set of operations and/or configurations that are necessary to carry out certain operations over the SRWC connection, such as which types of input/output devices are needed (or desired) and/or the scheme used for communicating information over the SRWC connection. In one embodiment, the profile can define services that are to be used by the vehicle and/or the personal SRWC device. And, in a particular embodiment, a hands-free profile (HFP) or a headset profile (HSP) can be used, where the HFP or HSP allows the vehicle to control common telecommunication operations (e.g., answering the phone, adjusting call volume) of the personal SRWC device using vehicle-user interfaces included as a part of the vehicle electronics. The profiles, including the Bluetooth™ profiles, can include a particular protocol (or sub-protocol) for carrying out communications and such protocols can be implemented in conjunction with the underlying SRWC protocol.

In one embodiment, an advanced audio distribution profile (A2DP) can be used, which allows for the communication of stereo audio data from one Bluetooth™ device to another, such as from the personal SRWC device to the vehicle. In other embodiments, a hands-free profile can be used and, in some embodiments, the hands-free profile can be dependent on A2DP. In other embodiments, an audio/video remote control profile (AVRCP), a hands-free profile (HFP), a health device profile (HDP), a human interface device profile (HID), a headset profile (HSP), a serial port profile (SPP), a SIM access profile (SAP), or a video distribution profile (VDP), and/or other profile can be used by the vehicle and the SRWC device 90. In at least one embodiment, the profile can be associated with one or more additional protocols or supplemental protocols in addition to the underlying SRWC protocol used in establishing the SRWC connection in general. Moreover, the profile can be associated with certain services used by a third-party application that is executed on the personal SRWC device.

In some embodiments, various profiles can be used or established using the same established SRWC connection. For example, a first streaming channel could be established for use between a first application of the personal SRWC device and the vehicle, and a second streaming channel could be established for use between a second application of the personal SRWC device and the vehicle. The various profiles can enable use of the SRWC connection for various services and for use by various applications of the personal SRWC device and/or vehicle. The method 200 continues to step 230.

In step 230, data is communicated over the SRWC connection according to the SRWC service. The data can be audio data, video data, audio/visual (A/V) data, or any other type of data. And, in some embodiments, the type of data can depend on the type of profile or service used or established. In addition to communicating data using the SRWC service, other data can be communicated between the wireless communications device 30 and the personal SRWC device 90, such as data relating to other SRWC services and/or data that is communicated using the core SRWC protocol or stack and without specifying a particular profile or service. The method 200 continues to step 240.

In step 240, a termination of the SRWC service is detected independently of a termination of the SRWC connection. The phrase "independently of a termination of the SRWC connection" does not mean that the SRWC connection was not terminated, but means that a termination (if any) of the SRWC connection is not used as a basis in detecting a termination of the SRWC service. The termination of the SRWC service can be determined by the personal SRWC device through receiving an error or other code indicating a failure in communicating data over the streaming channel and/or according to the profile. Or, in other embodiments, the personal SRWC device can receive a disconnection message that may be sent by the vehicle in response to turning off or terminating vehicle SRWC capabilities or services, such as ending a hands-free service or profile. For example, the vehicle may indicate that it does not presently support hands-free services and, thus, this can act to indicate termination of the SRWC profile. In yet another embodiment, the termination can be detected through monitoring a SRWC service status (including a SRWC service connection status) and then detecting a disconnected status of the SRWC service. Or, the termination can be detected through the personal SRWC device determining to end or terminate the SRWC service. The method 200 continues to step 250.

In step 250, it is determined whether to use a location of the personal SRWC device as the parked location of the vehicle. In one embodiment, this determination can include or be based on the outcome of a determination of whether the vehicle includes location determining capabilities, such as whether the vehicle includes a global navigation satellite system (GNSS) receiver 22, whether the GNSS receiver 22 of the vehicle is enabled or disabled, whether the reception of the GNSS receiver 22 is poor, and/or whether the GNSS receiver 22 is not working or malfunctioning. In some embodiments, any or all of these determinations can be carried out after detecting a termination of the SRWC service (step 240) and/or in response to detecting a termination of the SRWC service.

In one embodiment, determining whether to use a location of the personal SRWC device as the parked location of the vehicle can include determining whether the vehicle is in a parked state. In other embodiments, the determination of whether the vehicle is in a parked state can be carried out instead of determining whether to use a location of the personal SRWC device. As used herein, a "parked state" can be any state in which the vehicle is placed into a parking gear, the vehicle is placed into a neutral gear with a parking brake enabled, or the vehicle is placed in a state or condition that indicates the vehicle is being left unattended (e.g., primary mover is off and wheel and/or parking brakes are locked).

In some embodiments, determining whether the vehicle is in a parked state can include analyzing vehicle state information. The vehicle state information can be obtained by the vehicle using, for example, body control module (BCM) 26 and/or various other VSMs. The vehicle state information can then be communicated by one or more vehicle system modules (VSMs), such as body control module (BCM) 26, to other devices. In one embodiment, the vehicle may send vehicle state information to the personal SRWC device 90 via the established SRWC connection. The personal SRWC device 90 can then evaluate the vehicle state information to determine whether the vehicle is in a parked state. Or, in other embodiments, the vehicle can evaluate the vehicle state information to determine whether the vehicle is in a parked state and then can send the personal SRWC device 90 an indication representing whether the vehicle is in a parked state. In other embodiments, the vehicle state can be monitored continuously or at known or predetermined intervals and this information can be communicated to a remote server facility or the personal SRWC device 90 via the established SRWC connection (and can be communicated separately from the SRWC service). In a particular embodiment, the vehicle state information can be monitored and/or communicated to a remote server facility, such as remote server 80, and then stored into one or more databases. This vehicle state information can then be requested by various other devices, such as personal SRWC device 90, and, in response thereto, the remote server can generate and send a response to the requesting device.

The vehicle state information can include various data that can be used as a basis for determining whether the vehicle is or has recently been parked. Examples of vehicle state information include vehicle gear information that indicates a transmission gear that the vehicle is presently in, ignition or primary mover state information that indicates information regarding the state of the ignition or primary mover of the vehicle, parking brake (or other brake) information that indicates the state and/or actuation of one or more vehicle brakes, and/or various other vehicle state information that can be used to determine or predict whether the vehicle is parked. And, in one embodiment, the vehicle can determine whether it is in a parked state and, thereafter, can send an indicator informing the personal SRWC device (or other entity) of whether the vehicle is in the parked state. The method 200 continues to step 260.

As mentioned above, the vehicle state information can be evaluated and/or analyzed to determine whether the vehicle is in a parked state. In one embodiment, the vehicle state information is provided to the personal SRWC device and, thereafter, the personal SRWC device can analyze the vehicle state information to determine whether the vehicle is in a parked state. In other embodiments, the vehicle state information can be analyzed at the vehicle or at a remote server and, thereafter, information indicating whether the vehicle is in a parked state can be sent to the personal SRWC device via the established connection and/or via the remote server. The evaluation or analysis of the vehicle state information can include comparing the vehicle state information to predetermined conditions and, upon the vehicle state information matching the predetermined conditions, it can be concluded that the vehicle is in a parked state. The method 200 continues to step 260.

In step 260, a location of the personal SRWC device is obtained. The location of the personal SRWC device can be determined in a variety of ways. In one embodiment, the personal SRWC device can include a global navigation satellite system (GNSS) receiver that is configured to receive a plurality of GNSS signals from a plurality or constellation of GNSS satellites. In such an embodiment, the personal SRWC device can then determine the location of the personal SRWC device based on the received GNSS signals. In other embodiments, the personal SRWC device can use other location determining means, such as through using sensors to determine that the device is located at a particular mailing address or point of interest that is resolvable to a geographical location. For example, a particular service set identifier (SSID) can be associated with a user's home location (which corresponds to a particular address and geographical location) and, upon recognizing the presence of a network access device (NAD) that operates using the SSID, it can be determined that the personal SRWC device is at the user's home location (or other associated location). Additionally, this information can be used in determining whether the vehicle is parked or whether to use the personal SRWC device's location as the parked location of the vehicle. The method 200 continues to step 270.

In step 270, the location of the personal SRWC device is stored as a parked location of the vehicle. This can include storing the location of the personal SRWC device (which may be in the form of a geographical coordinate pair that includes latitudinal and longitudinal coordinates) in a manner such that it is identified as a parked location of the vehicle. The location can be stored on memory of personal SRWC device 90, or can be saved at a remote server, such as remote server facility 80. In other embodiments, the location can be stored at the vehicle.

The parked location of the vehicle can then be later recalled by a vehicle operator or passenger when requested by the operator or passenger. Or, the parked location of the vehicle can be automatically recalled and presented to the operator or passenger in response to a determination that the operator or passenger is heading towards or approaching the parked location, looking for the vehicle, and/or intending to soon operate the vehicle or head toward the vehicle. The parked location of the vehicle can then be presented to the user using various device-user interfaces of the personal SRWC device 90, such as a visual display. Additionally, at least in some embodiments, the SRWC device 90 can use a navigation system to direct the operator or passenger from their present location to the parked location of the vehicle. The parked location can be erased upon a user nearing the vehicle and/or upon the establishment of a SRWC connection or SRWC service between the vehicle and the personal SRWC device. In other embodiments, the parked location can be saved for use in future iterations of the method 200 for purposes of, for example, determining whether the vehicle is in a parked state and/or determining whether to use a location of the personal SRWC device as a parked location of the vehicle. The method 200 then ends.

In one embodiment, the method 200 or parts thereof can be implemented in a computer program (or "application", such as the vehicle parked location application discussed above) embodied in a computer readable medium and including instructions usable by one or more processors of one or more computers of one or more systems. The computer program may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media (such as memory of the personal SRWC device), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method(s).

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of determining a parked location of a vehicle, the method comprising:
   establishing a short-range wireless communication (SRWC) connection with the vehicle using a personal SRWC device, wherein the SRWC connection operates according to a first protocol;
   carrying out a SRWC service that is associated with the SRWC, wherein the SRWC service is a hands-free SRWC service that is carried out using a third-party application according to a hands-free profile, and wherein the third-party application is not permitted to access SRWC core connection information of the personal SRWC device and is permitted to monitor the hands-free SRWC service;
   detecting termination of the SRWC service independently of a termination of the SRWC connection by determining that the hands-free SRWC service has been terminated or is otherwise unavailable based on one or more messages transmitted according to the hands-free profile;
   in response to the detection of the termination of the SRWC service, obtaining a location of the personal SRWC device; and
   storing the location of the personal SRWC device as a parked location of the vehicle.

2. The method of claim 1, further comprising the steps of:
   receiving vehicle state information concerning the vehicle;
   determining whether the vehicle is in a parked state based on the received vehicle state information; and
   carrying out the obtaining step in response to both the detection of the termination of an audio streaming channel and to the determination that the vehicle is in a parked state.

3. The method of claim 2, wherein the vehicle state information is received via a connection to a remote server facility.

4. The method of claim 1, wherein the obtaining step is carried out in response to receive an indication from the vehicle via the established SRWC connection that the vehicle is in a parked state.

5. The method of claim 1, wherein the established SRWC connection is carried out according to a first SRWC protocol, wherein the SRWC service is carried out according to a second protocol, and wherein the SRWC service further includes using the first protocol to carry out communications in addition to the second protocol.

6. The method of claim 1, wherein the SRWC connection is a Bluetooth™ connection, wherein the first protocol is a Bluetooth™ protocol, and wherein the SRWC service is carried out according to a Bluetooth™ profile.

7. A method of determining a parked location of a vehicle, the method comprising:
    establishing a short-range wireless communication (SRWC) connection with the vehicle using a personal SRWC device, wherein the SRWC connection operates according to a first protocol;
    establishing a SRWC service channel using the established SRWC connection, wherein the dedicated SRWC service channel is established according to a SRWC profile;
    detecting termination of the SRWC service channel independently of a termination of the SRWC connection;
    determining that the vehicle is in a parked state by receiving an indication from the vehicle that the vehicle is in the parked state, wherein the indication is based on analysis of vehicle state information of the vehicle;
    in response to the detection of the termination of the SRWC service channel, obtaining a coordinate location of the personal SRWC device by:
        receiving a plurality of global navigation satellite system (GNSS) signals from a plurality of GNSS satellites at a GNSS receiver included on the personal SRWC device; and
        processing the plurality of GNSS signals using the GNSS receiver to obtain the coordinate location of the personal SRWC device; and
    storing the coordinate location of the personal SRWC device as a parked location of the vehicle.

8. The method of claim 1, wherein the SRWC service is carried out according to a sub-protocol of the SRWC.

9. The method of claim 1, wherein the location of the personal SRWC device is a coordinate location of the personal SRWC device as determined by a GNSS receiver of the personal SRWC device, wherein the determination of the coordinate location includes receiving a plurality of global navigation satellite (GNSS) signals from a plurality of GNSS satellites and determining a coordinate location of the personal SRWC device through processing the plurality of GNSS signals.

10. The method of claim 1, further comprising the step of determining whether to use location information of the personal SRWC device as the parked location of the vehicle and, when it is determined to use location information of the personal SRWC device as the parked location of the vehicle, then carrying out the obtaining step.

11. The method of claim 7, wherein the SRWC profile is an advanced audio distribution profile (A2DP), an audio/video remote control profile (AVRCP), a hands-free profile (HFP), a health device profile (HDP), a human interface device profile (HID), a headset profile (HSP), a serial port profile (SPP), a SIM access profile (SAP), or a video distribution profile (VDP).

12. The method of claim 7, wherein the SRWC service channel is established according to the SRWC profile, wherein the established SRWC connection includes carrying out a SRWC core protocol and wherein the SRWC profile includes a supplementary protocol that is carried out in conjunction or based on the SRWC core protocol.

13. The method of claim 7, wherein the SRWC service channel is an audio and/or video streaming channel that is used to stream audio and/or video from the personal SRWC device to the vehicle.

14. A personal short-range wireless communication (SRWC) device, comprising:
    a short-range wireless communication (SRWC) circuit that enables SRWC between the personal SRWC device and another SRWC device;
    a global navigation satellite system (GNSS) receiver that is configured to receive a plurality of GNSS signals from a constellation of GNSS satellites;
    a memory including a vehicle parked location application; and
    a processor for carrying out the vehicle parked location application;
    wherein the vehicle parked location application includes computer instructions that, when executed by the processor, causes the personal SRWC device to:
        establish a short-range wireless communication (SRWC) connection with a vehicle using a personal SRWC device, wherein the SRWC connection operates according to a first protocol;
        carry out a SRWC service that is associated with the SRWC using a third-party application of the personal SRWC device, wherein an operating system (OS) of the personal SRWC device disallows SRWC core connection information to be monitored or known by certain third-party applications including the third-party application;
        detect termination of the SRWC service independently of a termination of the SRWC connection by determining that the SRWC service has been terminated or is otherwise unavailable based on one or more messages transmitted according to the SRWC service;
        in response to the detection of the termination of the SRWC service, obtain a location of the personal SRWC device based on the plurality of GNSS signals; and
        store the location of the personal SRWC device as a parked location of the vehicle.

15. The personal SRWC device of claim 14, wherein the third-party application is a vehicle-device application that is stored in the memory, and wherein the vehicle-device application, when executed by the processor, uses the SRWC service.

16. The personal SRWC device of claim 14, wherein the vehicle parked location application, when executed by the processor, further causes the personal SRWC device to: receive an indication from the vehicle via the established SRWC connection that the vehicle is in a parked state.

17. The personal SRWC device of claim 14, wherein the established SRWC connection is carried out according to a first SRWC protocol, wherein the SRWC service is carried out according to a second protocol, and wherein the SRWC service further includes using the first protocol to carry out communications in addition to the second protocol.

* * * * *